United States Patent [19]

Embutsu et al.

[11] Patent Number: 5,699,525
[45] Date of Patent: Dec. 16, 1997

[54] INFORMATION MANAGEMENT APPARATUS DEALING WITH WASTE AND WASTE RECYCLE PLANNING SUPPORTING APPARATUS

[75] Inventors: Ichiro Embutsu, Goleta, Calif.; Kenji Baba, Hitachi, Japan; Masayoshi Kubota, Hitachiota, Japan; Harumi Matsuzaki, Hitachi, Japan

[73] Assignee: Hitachi, Ltd., Tokyo, Japan

[21] Appl. No.: 71,492

[22] Filed: Jun. 4, 1993

[30] Foreign Application Priority Data

Jun. 9, 1992 [JP] Japan ................................ 4-149207

[51] Int. Cl.$^6$ ........................................ G06F 17/60
[52] U.S. Cl. .................. 395/207; 395/230; 364/478.01; 235/385; 235/376
[58] Field of Search ........................ 364/400, 401, 364/409, 424.01, 424.02, 444, 443, 478; 235/383

[56] References Cited

U.S. PATENT DOCUMENTS

| | | | |
|---|---|---|---|
| 4,360,875 | 11/1982 | Behnke | 364/436 |
| 4,427,551 | 1/1984 | Duveau | 210/741 |
| 5,042,634 | 8/1991 | Gulmini | 194/209 |
| 5,051,914 | 9/1991 | Sansone et al. | 364/478 |
| 5,055,237 | 10/1991 | Husseiny | 252/631 |
| 5,190,165 | 3/1993 | Garfield, Jr. | |
| 5,249,690 | 10/1993 | Patterson | 209/630 |
| 5,272,638 | 12/1993 | Martin et al. | 364/449 |

FOREIGN PATENT DOCUMENTS

| | | |
|---|---|---|
| 6012403 | of 0000 | Japan . |
| 59-85568 | 5/1984 | Japan . |
| 61-80354 | 4/1986 | Japan . |

OTHER PUBLICATIONS

Software Description–Landfill Accounts Receivable 2.X, Jan. 25, 1992–released.
*New Scientist*, "Infrared Makes Light Work of Sorting Plastics," Jul. 17, 1993, p. 20.
Software Description–RICS Waste Accounting 2.1.
*Plastics News*, "Why Waste America Venture to Reprocess Polyethylene".
"Learning Representations by Backpropagating Errors," *Nature*, vol. 323, pp. 533–536, 1986, Rumelhant et al.
AWARE, published by Recra Environmental, Inc., Mar. 8, 1991, pp. 1–38.
Rathi et al., "Allocating Resources to Support a Multicommodity Flow with Time Windows," *The Logistics and Transportation Review*, v28, n2, Jun. 1992, pp. 167–188.
Tyworth, "Modeling Transportation–Inventory Trade–Offs in a Stochastic Setting," *Journal of Business Logistics*, v13, n2, 1992, pp. 97–124.
Netter et al., "Applied Statistics", Fourth Edition, Chapter 20, pp. 599–604.
Press et al., "Numerical Recipes in C", Second Edition, pp. 661–666, 1988.
Gupta et al., "Towards Designing an Information–Flow–Structure of Resource Wastes for National Planning", *Systems Research*, vol. 5, No. 3, pp. 247–254, 1988.

(List continued on next page.)

*Primary Examiner*—Gail O. Hayes
*Assistant Examiner*—Barton L. Bainbridge
*Attorney, Agent, or Firm*—Antonelli, Terry, Stout & Kraus, LLP.

[57] ABSTRACT

An information management apparatus dealing with waste in a waste recycling system comprises an information management device for managing information on waste of each depository, and a device of determining the waste collection method based on the information and the process volume of a recycling processor. The apparatus determines the waste collection method so that recycling products can be delivered stably.

16 Claims, 5 Drawing Sheets

OTHER PUBLICATIONS

Clark et al., "Systems Planning for Solid Waste Collection", Computers & Operations Research, vol. 3, No. 3, pp. 157–173, 1976.

Morris et al., Database Inspec. Institute of Electrical Engineers, Inspec. No. 339076, vol. 1, pp. 419–422, (Abstract) 1988.

Jordan et al., "Forward Models: Supervised Learning with a Distal Teacher", Cognitive Science vol. 16, No. 3, pp. 307–354, 1992.

Morris et al., "Using Bar Codes To Manage Radwaste In A Nuclear Power Facility", Waste Processing, Transportation, Storage and Disposal, Technical Programs and Public Education, vol. 1.

INFORMATION MANAGEMENT APPARATUS DEALING WITH WASTE AND WASTE RECYCLE PLANNING SUPPORTING APPARATUS

BACKGROUND OF THE INVENTION

1. Field of the Invention

This invention relates to an information management apparatus dealing with waste in a recycling system which processes waste for recycling, and particularly to a information management apparatus dealing with waste suitable for use in a recycling system which collects discarded home electric appliances and processes them for recycling. The invention also relates to a waste generation quantity prediction apparatus and a waste recycling plan supporting apparatus.

2. Description of the Related Art

As a result of the prevalence of home electric appliances, discarded home electric appliances are increasing drastically and processing of these objects is becoming environmental problem. Discarded home electric appliances of end users (consumers) are collected by the local governing bodies, home electric appliance dealers and waste processing agents, and, after being transported to the recycling facility, these objects are processed for recycling or destruction. It is expected that the recycling system for reclaiming discarded home electric appliances will become more important in the future.

Among publications dealing with the information management of waste, Japanese patent publication JP-A-60-12403 describes a waste collection management system intended to collect garbage efficiently through the provision of a means of monitoring the quantity of a plurality of garbage stacked in each of depositories located within a collection area.

Japanese patent publications JP-A-61-80354 and JP-A-59-85568, as other publications dealing with information management, describe systems for providing the information of used car transactions with the transaction information systems including a central computer and terminals units installed in dealer shops in on-line connection to the central computer, and designed to register intended transaction conditions of sellers and buyers of used cars through the terminal units to the central computer so as to provide the transaction information for both parties through the search operation.

In the recycling system, it is important to feed certain types or kinds of discarded home electric appliances to the recycling facility so as to meet the demand of recycling products. However, there is no means of information management for dealing with the matter of what type of and what amount of discarded home electric appliances should be collected from which waste depository. Therefore, the type and quantity of discarded home electric appliances to be fed to the recycling facility can, at best be adjusted within the range of capacity of the stockyard where collected discarded home electric appliances are stored. There is no means of assessment of the quantity of waste generated in the future, and therefore it is not possible to have a long-term prospect of waste supply to the recycling system.

The foregoing publications concerning the handling of waste merely disclose the information management for carrying out the efficient collection of garbage stacked in multiple depositories in a collection area, and they are not designed to determine the type and quantity of waste to be collected.

The above-mentioned used car transaction information system is not designed to determine the type and quantity of used cars to be collected.

SUMMARY OF THE INVENTION

An object of this invention is to provide an information management apparatus dealing With waste capable of supplying waste to meet the demand of the waste recycling facility.

This invention resides in an information management apparatus dealing with waste in a waste recycling system which collects waste stacked in a plurality of depositories and reclaims the waste through the process with a recycling processor (i.e., central recycling facility). The apparatus comprises information management means for managing information on the type or kind and quantity of waste stacked in each of the depositories, and waste collection method determination means for determining the method of collection of waste, which is transported from the depositories to the recycling processor, in accordance with the process volume of the recycling processor and information provided by the information management means.

Through the determination of the waste collection method based on the waste management information, it becomes possible to feed waste continuously and stably to the recycling facility (i.e., controlling operation to ensure that a steady or substantially constant supply of recycled items are available or are being processed within the recycling system to supply consumer demand without interruption.).

Additionally the above-mentioned determination manner of the waste collection method, may be based on the stock volume of the stockyard of the recycling facility and information provided by the information management means. This is because the stock volume of stockyard varies with the progress of processing of the recycling processor.

The inventive information management apparatus dealing with waste is preferably provided with process volume determination means for determining the process volume of a recycling processor based on the quantity of recycling products demanded by demanding parties and means of determining the waste collection method in consideration of the determined process volume, and consequently it becomes possible to supply recycling products of certain types or kind and certain quantities to the demanding parties constantly and stably.

On determining the process volume a recycling processor based on the demanded quantity of recycling products, it is desirable to determine the type or kind and quantity of waste to be collected in consideration of the space and stock volume of the stockyard and determine the collection method in consideration of the information provided by the information management means. The determination of the amount of waste collection in consideration of the demanded quantity of recycling products and the space and stock volume of the stockyard can possibly encounter the case in which the quantity of waste stacked in the depositories (i.e., storage or collection locations at various levels of the collection process within the recycling system, such as, consumer bins or receptacles, city collection yards or stockyards, county collection yards or stockyards, etc.) does not suffice for the determined quantity. In order to prevent the occurrence of such situation, it is desirable to determine the type or kind and quantity of waste to be collected in consideration of the information provided by the recycling product demanding parties and the information management means.

Additionally, in determining the waste collection method, it is desirable to determine the collection region and collection route in consideration of the geographic information of the collection area. Addition of the information of traffic volume in the collection area is also effective. Consequently, the efficiency of waste collection from the waste depositories can be enhanced, and the expenditure and time for the waste collection can be reduced.

The inventive information management apparatus is preferably provided with terminal units for entering the type or kind and quantity of waste at individual depositories and a computer connected with these terminal units through a communication network so as to manage information on the type or kind and quantity of waste collected at each depository.

The terminal unit installed at each depository preferably includes means for reading identification code labels appended to objects which will be sources of waste, with the code reading means preferably being a bar code reader.

This invention also provides an information management apparatus dealing with waste comprising waste stock volume management means for managing the quantity of waste stacked in each of the waste depositories in the past based on information provided by the depositories, collection area information management means for managing information which represents the feature of small areas that are divisions of a waste collection area, and waste generation prediction means for predicting the quantity of generation of waste in the small areas based on information provided by the waste stock volume management means and information provided by the collection area information management means. The information of the feature of small areas preferably includes at least one of the number of residents, the land price and the use of area, i.e., industrial area, commercial area, residential area or farming area.

This invention also provides an information management apparatus dealing with waste comprising waste stock volume management means for managing the quantity of waste stacked in each of the depositories in the past based on information provided by the depositories, collection area information management means for managing information which represents the feature of small areas that are divisions of a waste collection area, waste generation prediction means for predicting the quantity of generation of waste in the small areas based on information provided by the waste stock volume management means and information provided by the collection area information management means, and recycle plan determination means for determining at least one of the recycling process plan of the future, the size of stockyard and the method of transportation of waste to the recycling processor based on the result of prediction of waste generation.

The waste collection method determination means may include computation means based on a multi-layered neural network model. This means enables the establishment of an accurate model even if the algorithm of predicting the quantity of waste supply and the like is not known in advance.

The recycling system equipped with the inventive information management apparatus dealing with waste is capable of feeding waste to the recycling facility stably, and it is desirable to simplify the entry of the waste information at waste depositories through the attaching of bar code labels on the surface of objects which will be sources of waste for the sake of a reinforced support of the recycling system.

Through the management of information of waste depositories and the determination of the type or kind and quantity of waste which is transported from the depositories to the recycling facility, and the places and route of collection in consideration of the process volume of the recycling processor, it becomes possible to collect waste efficiently. Consequently, recycling products can be supplied constantly and stably supplied to the demanding parties.

DESCRIPTION OF THE PREFERRED EMBODIMENTS

This invention can be applied to recycling systems for collecting and reclaiming waste which is stacked (i.e., stored) distributively in a collection area, such as a recycling system for discarded home electric appliances including washing machines, refrigerators and television sets, and to a recycling system for discarded vehicles including automobiles and motorcycles. Recycling can be of intact and working items which have not been exhausted of useful life, or of disassembled or removed components from such items.

Figure 1:
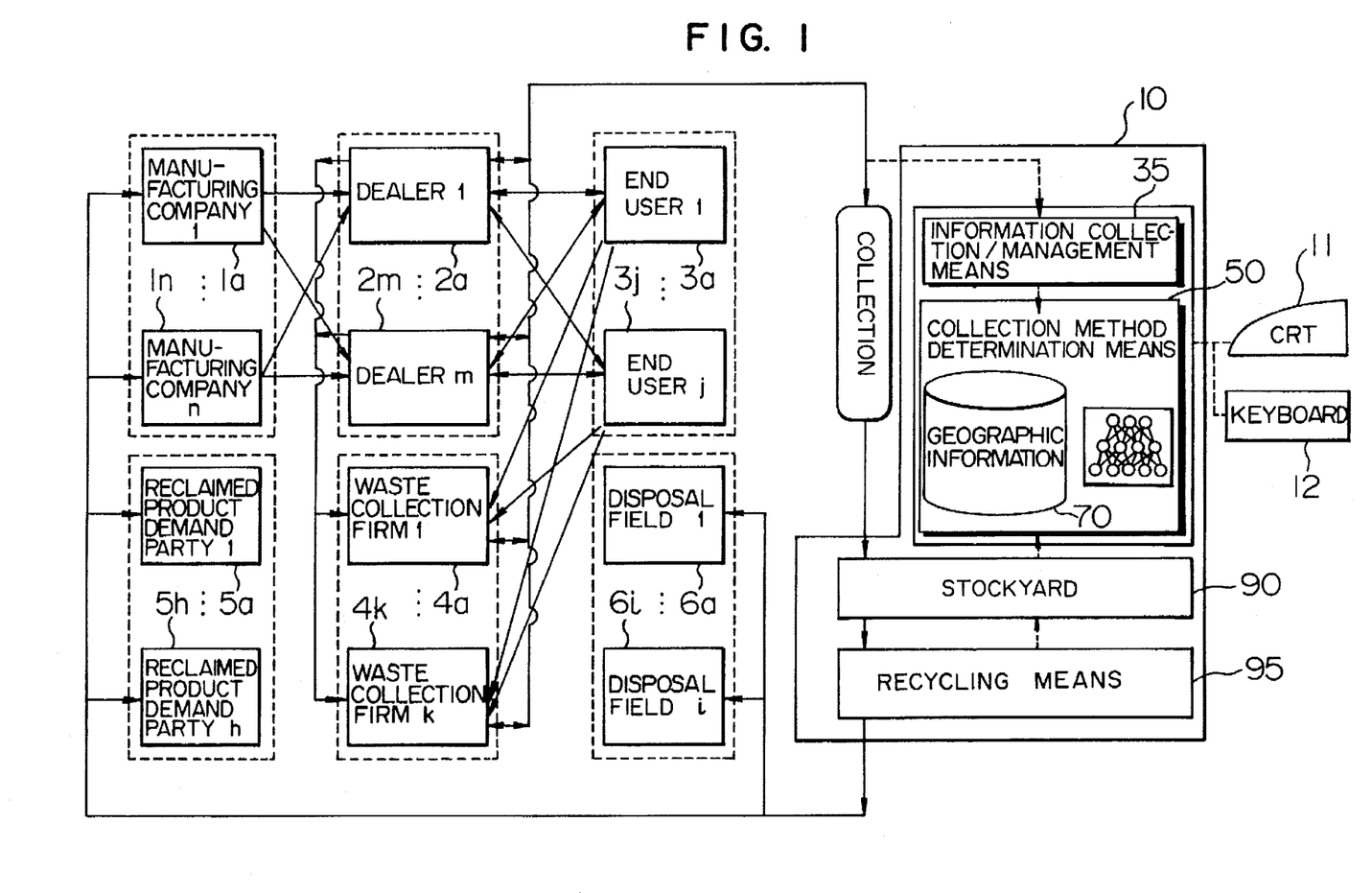
FIG. 1 is a block diagram showing the overall arrangement of the recycling system of discarded home electric appliances to which the information management apparatus dealing with waste based on this invention is applied.

FIG. 1 is a block diagram showing the overall arrangement of the information management apparatus dealing with waste based on an embodiment of this invention which is applied to a recycling system for discarded home electric appliances.

In FIG. 1, home electric appliances manufactured by multiple manufacturing companies $1a$ through $1n$ are sold to multiple dealers $2a$ through $2m$ by way of several wholesalers (not shown), and ultimately the appliances are retailed to multiple end users $3a$ through $3j$. Together with the flow of actual home electric appliances, information on the number of transaction between the manufacturers, retailers and end users is flowing on the same commercial routes. Discarded home electric appliances held by end users are taken by retailers in exchange for the purchase of new appliances at the time of purchase in many cases. Otherwise, discarded home electric appliances are taken by waste collection firms $4a$ through $4k$. Discarded home electric appliances collected by the retailers and waste collecting agents are brought to a recycling system 10, by which they are processed for recycling. Recycling products coming out of the recycling system 10 are supplied to the manufacturers and reclaimed product demand parties $5a$ through $5h$. Low-value recycling products having no accepting parties are discarded to disposal fields $6a$ through $6i$.

The recycling system 10 enables the following constituents.

(1) collection means 30,
(2) information collection/management means 35,
(3) collection method determination means 50,
(4) stockyard 90,
(5) recycling means 95

The information collection/management means 35 collects and manages commercial information of home electric appliances and sends the information to the collection method determination means 50. The collection method determination means 50 determines an efficient collection method based on this information, and activates the collection means 30. The collection means 30 collects discarded home electric appliances under control of the determination means 50, and transports the collected objects to the stockyard 90 of the recycling facility. Discarded home electric appliances stacked in the stockyard 90 are combined in terms of the type or kind and quantity of objects so that the recycling product has a uniform quality, and fed to the recycling means 95 in the recycling facility and rendered to the recycling process. Among such products, valuable recycling products are placed back on the commercial routes.

The collection means 30 is a means of transporting discarded home electric appliances collected by the retailers and waste collecting agents to the stockyard 90 of the recycling system 10. Specifically, it includes a number of trucks having a capacity of several tons. The number of trucks needed is dependent upon the quantity of discarded home electric appliances to be collected, and, for example, three 2-ton trucks are required to collect 100 sets of two-chamber washing machines. The collection means 30 operates to collect discarded home electric appliances in the collection area in accordance with the method determined by the collection method determination means 50.

In case the retailers and waste collecting agents provide transportation means (such as trucks) for transporting discarded home electric appliances to the stockyard 90, they may take the place of the collection means 30. In this case, the output of the collection method determination means 50 is displayed on the display screen of information terminal units 41a–41d (FIG. 2) possessed by the retailers and waste collecting agents.

Figure 2:
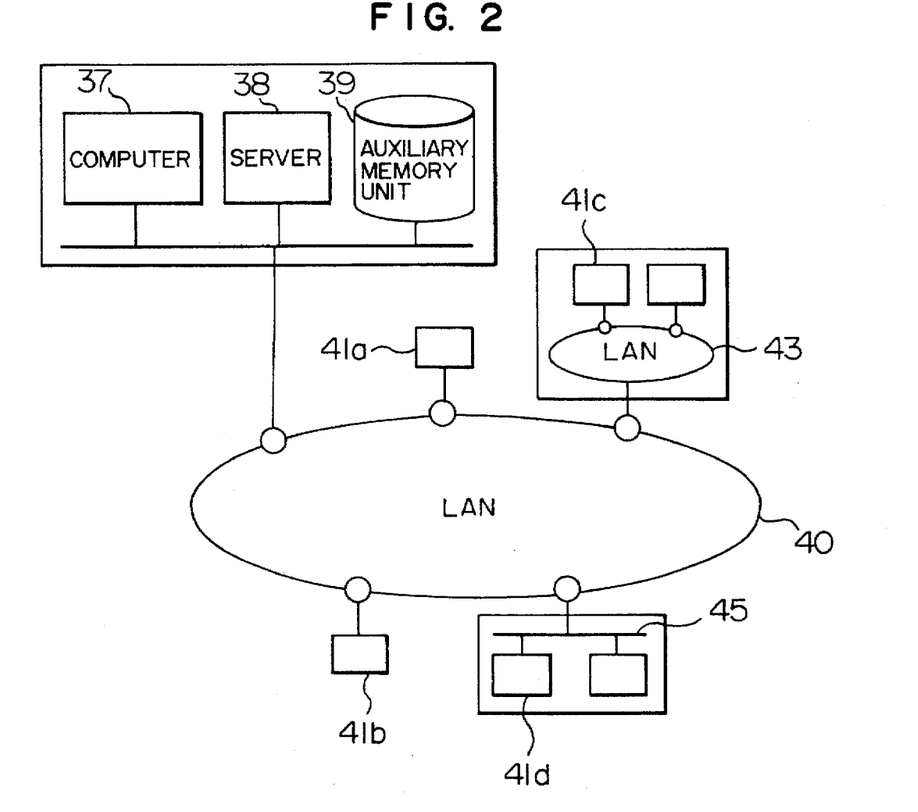
FIG. 2 is a diagram showing the hardware structure of the information collection/management means.

The information collection/management means 35 is a means of collecting and managing information flowing together with home electric appliances in the collection area. The content of information is specifically the type or kind and quantity of home electric appliances, the time of sale or collection, and the location of sale or collection. FIG. 2 shows an example of the hardware structure of the information collection/management means 35. The sale or collection data is entered on information terminal units 41a, 41b, 41c, 41d connected to the system through a LAN (local area network) 40. The information terminal units 41a–41d of the retailers and waste collecting agents are not required to be an exclusive communication equipment for the recycling system, but they may be used also for the inventorial job. The LAN 40 is not required to be an exclusive communication line for the recycling system, but it may be an existing line used mainly for the communication among the chain stores of retailers for example. Some information terminal units 41 may be connected to separate LAN 43 and LAN 45 in connection with the LAN 40 in some cases. Installed in the recycling system 10 are a network server 38 for managing the LAN 40 and a computer 37 for managing data. In the case of managing a vast amount of data, it is desirable to include an auxiliary memory unit 39.

Figure 3:
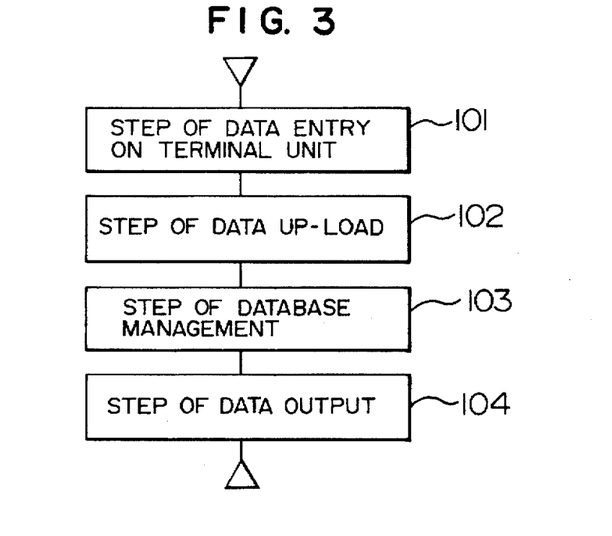
FIG. 3 is a flowchart showing the operation of the information collection/management means.

FIG. 3 shows in flowchart form the operation of the information collection/management means 35. In the first step 101 of data input, various kinds of data mentioned previously are entered through the information terminal unit 41 installed at each retailer or waste collecting agent. Input data is stored in the memory in the terminal unit. In the subsequent step 102 of data up-loading, stored data is transmitted to the data management computer 37 at a constant interval. In the database management step 103, transmitted data is stored in the computer 37 or a database formed in the auxiliary memory unit 39. Preferably, data is stored in correspondence to location information (geographic information which will be explained later) of each data originating retailer or waste collecting agent. In the final step 104 of data output, data or the result of computation across data items is returned to the collection method determination means 50 in response to the request.

Since data input on the terminal units in the data input step 101 becomes very busy in dealing with a vast amount of data, it is desirable to attach optically readable identification code labels on home electric appliances from the beginning so as to save the labor of reading. For this purpose, the information terminal unit 41 is preferably equipped with an optical character or bar code reader 13 for reading the code label attached on each home electric appliance. The identification code used here may be of the bar code notation used widely in the POS (point of sales) system. Using the code label enables the accurate and prompt entry of information including the kind or type, manufacturing data, and manufacturer of each discarded home electric appliance necessary for the collecting operation. The code labels are preferably affixed to home electric appliances at the time of manufacturing, and these appliances with code labels are distinguished as recycling-promoting appliances from those without code labels.

Next, the collection method determination means 50 based on this invention will be explained in detail. This means is formed in the same computer in which the information collection/management means 35 is formed. This means implements the following two major processes. One process is to determine the method of daily collection, and another process is to support the determination of a long-term collection plan. These processes will be explained in order.

Figure 4:
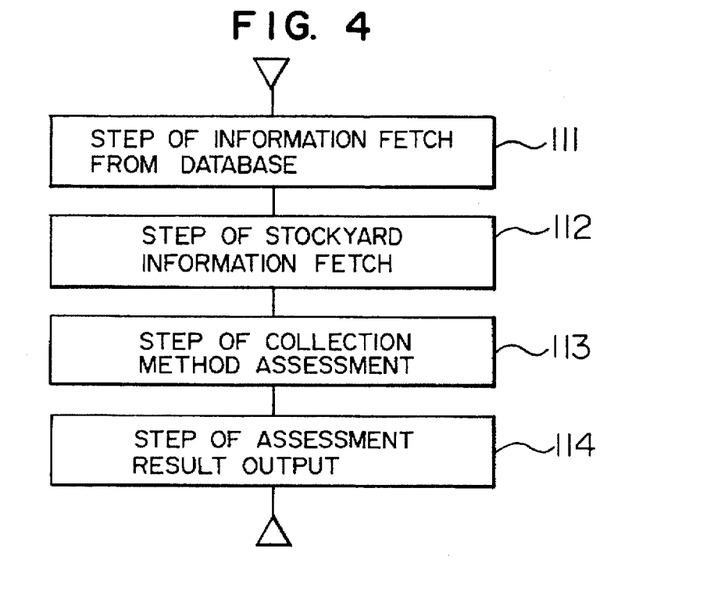
FIG. 4 is a flowchart showing the operation of the waste collection method determination means.

As shown in FIG. 4, in the database information entry step 111, data necessary for the determination of collection method is fetched from the database. Items of data to be entered are determined in advance, or alternatively an arbitrary data item may be specified in an interactive manner on a keyboard 12. Specifically, data items include the quantities of home electric appliances sold and collected by each retailer, the quantity of discarded home electric appliances collected by each waste collecting agent, the type of these appliances, and the time length of storage after collection. Data of the demand volume and market price of recycling products (glass, steel, aluminum, plastics, etc.) are also entered in this step. In the subsequent step 112 of entering stockyard information, data of the type and quantity of discarded home electric appliances which are already stacked in the stockyard 90 and data of the vacant area of the stockyard 90 are entered.

Figure 5:
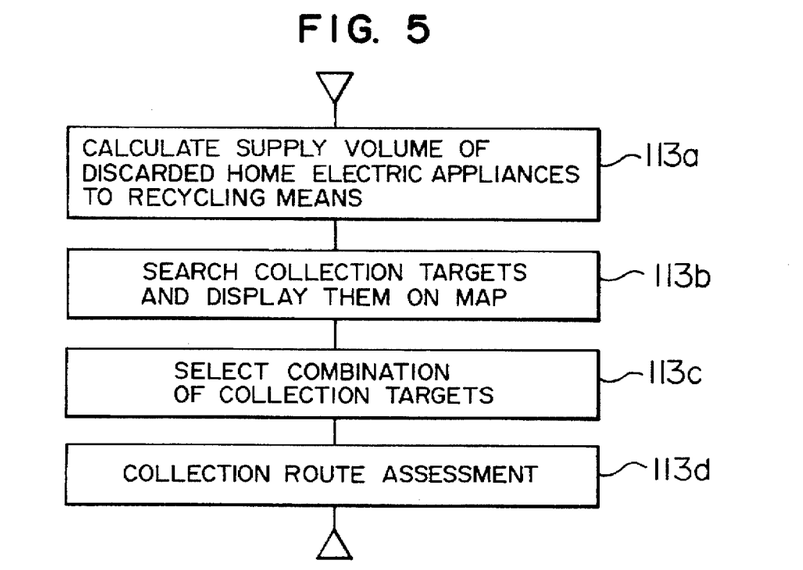
FIG. 5 is a flowchart showing the collection method assessment process implemented by the collection method determination means.

In the subsequent step 113 of collection method assessment, the most efficient collection method at that time point is determined based upon the data entered in the previous step. The collection method concerned here is the matter of what amount of discarded home electric appliances among those distributed in multiple places within the collection area should be collected from individual places in what order and through which route. As shown in FIG. 5, in the first step 113a, the quantity of discarded home electric appliances to be fed to the recycling means 95 is calculated based upon the waste supply condition including the demand volume of recycling products. A model as shown by equation 1 is used for this calculation.

$$A = f(B), \text{ or } A = f \cdot B \tag{1}$$

where A is the supply volume of discarded home electric appliances, and B is the demand volume of recycling product, and f is the supply volume determination model.

The variable A represents the supply volume of a home electric appliance j of type or kind (e.g., the number of two-chamber washing machines supplied), or the supply volume of different appliances in combination (e.g., the number of single-chamber washing machines, two-chamber washing machines, two-door refrigerators, etc. supplied). The variable B represents the demand volume of recycling product k (e.g., the quantity of funnel glass in demand), or the quantity of different products in combination (e.g., the quantity of funnel glass, panel glass, etc. in demand). The model f can be created from the knowledge of the component parts of each home electric appliance and the materials of the parts. The model is expressed in the form of a multi-regressive model, neural network model, matrix, or the like. The neural network model is of multi-layer type (also called Rumelhart model), with corresponding to the variable B data and data A being placed on the input layer and output layer, respectively. The neural network model is created by the learning calculation based on the conventional error back propagation method (for details, refer to article entitled "Learning representations by back propagating errors" in Nature, volume. 323, pages 533–536, written by Rumelhart, D. E., etc. in 1986).

Alternatively, the demand volume of the recycling facility is assumed to be the supply volume of discarded home electric appliances in some cases, instead of using the above-mentioned calculation for the prediction of supply volume. The demand volume of recycling product can also be evaluated as a function of the market price of the product in place of the demand volume of demanding parties.

Figure 6:
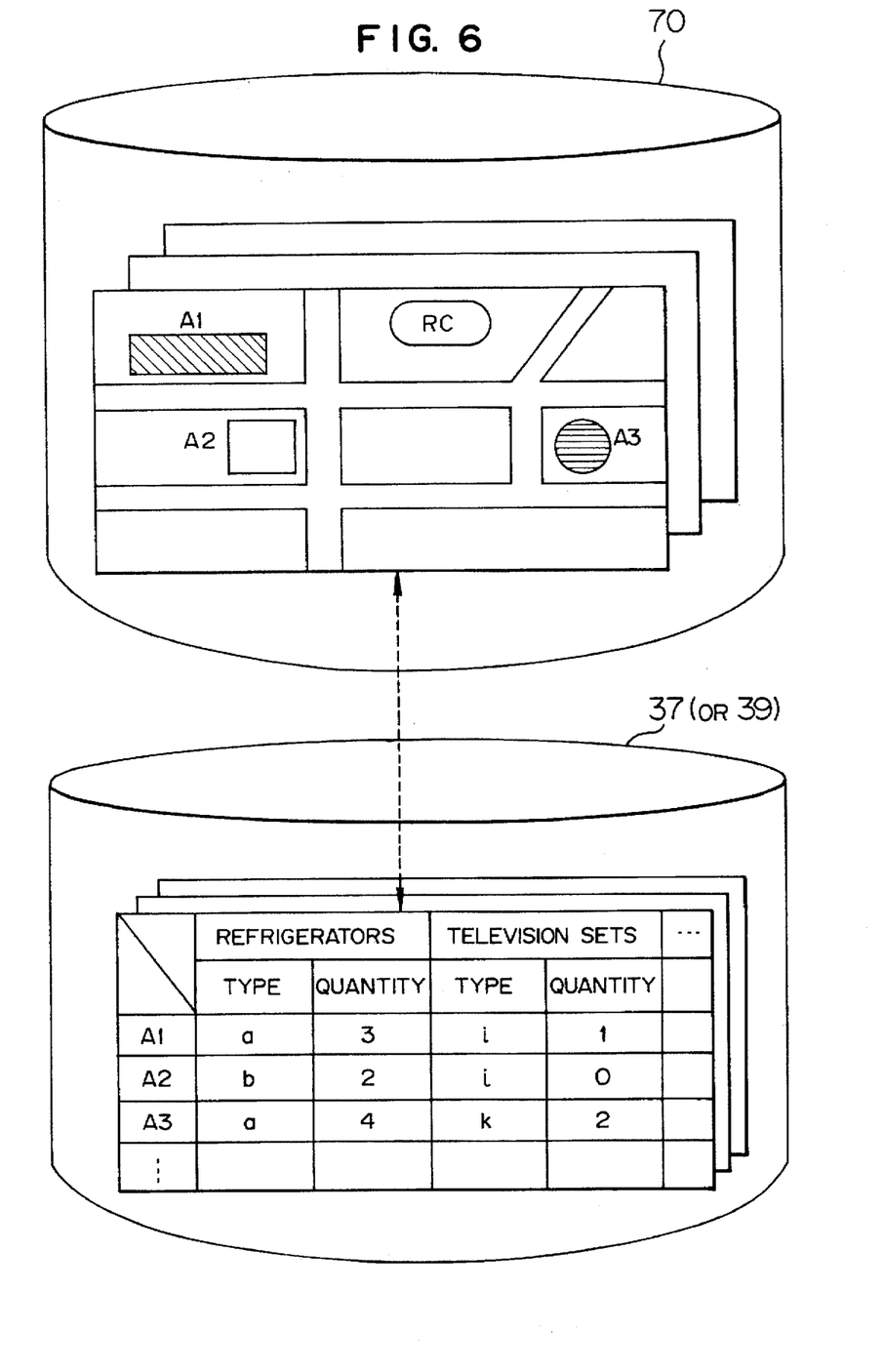
FIG. 6 is a diagram explaining the relation between the map information and the database.

In the next step 113b, the computer 37 or the database of the auxiliary memory unit 39 is searched for all collection targets (the locations of collection and the number of home electric appliances) for each home electric appliance with a supply volume of one or more to the recycling means 95 as a result of the preceding calculation. This embodiment is designed to implement this search operation in connection with the geographic information 70. FIG. 6 depicts in a sense of model the geographic information 70. The geographic location includes information on the roads in the collection area and the locations of collection (locations of retailers and waste collecting agents). The computer 37 or the database of the auxiliary memory unit 39 is organized to match the locations of collection on the geographic location which is displayed on the display unit 11. The extracted collection targets are highlighted in different colors on the displayed map so that the distribution of home electric appliances to be collected is easily visible.

In the next step 113c, the combination of collection targets which meets the conditions on the ability of the collection means 30 and the available area of the stockyard 90 is determined. If more than one combination meets the conditions, one with the longest time of storage at the the collection place is selected.

In the next step 113d, the collection route of the collection targets which have been determined in the preceding step is determined. Generally, there are multiple routes for the collection means 30 to take in collecting discarded home electric appliances at multiple collection targets and transporting them to the stockyard 90. In order to determine the most efficient, i.e., lowest cost, route from among these possible routes, the collection cost is calculated by a model expressed by the following equation.

$$\text{collection cost} = g \text{ (length of route, degree of traffic congestion)} \tag{2}$$

where g is the cost calculation model.

This model is a function of the length of collection route and the degree of traffic congestion of the route, and it indirectly reflects the fuel and transportation time expended by the collection means 30. The collection route length is evaluated from the geographic information 70 based on the technique known in the art. The degree of traffic congestion of the route is defined to be a relative value, which is large when the traffic congestion arises and it is small when the traffic is smooth, and it is calculated from the information on the use of area around the route (i.e., residential area, commercial area, etc.) included in the geographic information 70. It is more desirable to measure the degree of traffic congestion on a real-time basis by vehicle recognition devices installed in the collection area. These are the details of the collection method assessment step 113.

In the final step 114 of assessment result output, the collection method which has been determined to be most efficient in the preceding step 113 is displayed on the display unit 11. These are the details of the collection method determinating process. Next, the collection plan determination supporting process which is another process implemented by the collection method determination means will be explained.

Figure 7:
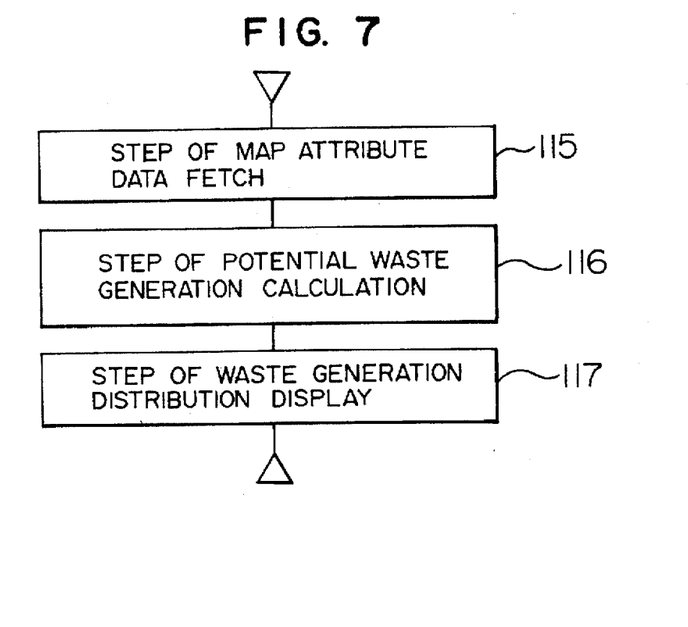
FIG. 7 is a flowchart showing the waste collection plan determination supporting process.

Flowchart of FIG. 7 predicts the quantity of generation of discarded home electric appliances in the collection area to provide information for determining a long-term collection plan. Specifically, it predicts the quantity of generation of discarded home electric appliances in the collection area in the future for planning the disposition of collection means 30 and the reinforcement of ability, or for setting prioritized collection regions. In the first step 115 of entering geographic attribute data, data of quantity of home electric appliances sold by the retailers, land price, number of residents, and membership of residents in the collection area is entered. In the next step 116 of calculating the quantity of potential waste generation, the distribution of potential waste generation in regions of the collection area is calculated by using the entered data based on the model of the following equation $$w(x, y) = h(a, b, c, x, y) \tag{3}$$

where w(x, y) is the quantity of potential waste generation in region x at the time after y years from now, a is the quantity of home electric appliances sold in the x region, b is the average number of residents in the x region, c is the quantity of waste generation of the x region in the past, and h is the potential waste generation calculation model.

The model h of the equation (3) can be expressed in the form of a multi-regressive model, neural network or the like as in the case of the equation (1). In the final step of displaying the waste generation distribution, the potential waste generation is displayed in different colors depending upon the level of generation in each region of collection area on a map of the geographic information 70 on the display unit 11. Consequently, the distribution of the generation of discarded home electric appliances at the time point after arbitrary number of years from now can be presented in an easily visible manner as useful information for the determination of the collection plan. These are the procedures of the collection plan determination supporting process.

The recycling means as includes a number of machines installed in the recycling facility. The recycling means 95 is based on the conventional technology, and its operation is shown as an example in the flowchart of FIG. 8. Initially, discarded home electric appliances stored in the stockyard 90 are brought in and they are partially disassembled. Such component parts as motors and compressors separated in this step are sent to a low-temperature smashing machine and other disassembled parts are sent to a normal-temperature compacting machine, and all parts are compacting. The coolant, i.e., chlorofluorocarbon (CFC), contained in compressors is collected prior to compacting process. Foam polyurethane discharged from the normal-temperature compacting machine is collected and treated in the CFC collection process. Smashed materials discharged by the low and normal-temperature compacting machines are fed through a magnetic selection machine and eddy current selection machine, and steel and aluminum are collected. The residual of these processes is fed through a plastics separator, and it is separated into plastics and glass. Plastics are separated into polyethylene, polypropylene, polystyrene, etc., and then collected.

Figure 8:
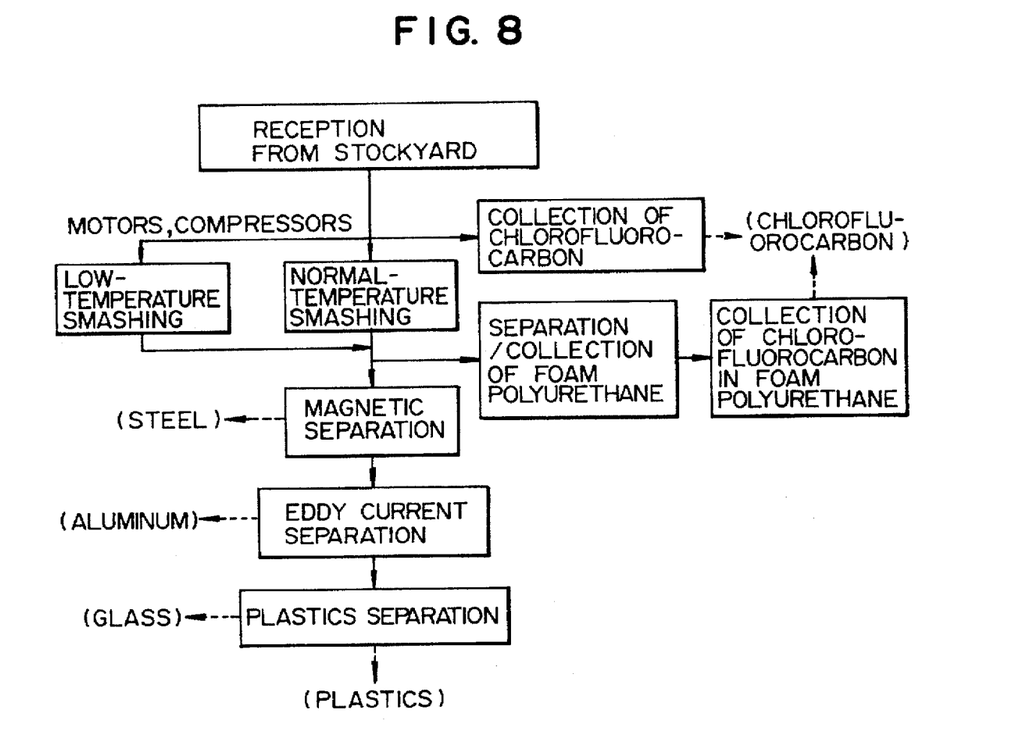
FIG. 8 is a flowchart showing the operation of the recycling means.

Among the recycling products delivered by the recycling means 95, less valuable materials are discarded in landfills, and other materials are supplied back to the manufactureres and recycling product demanding parties.

Through the collection of discarded home electric appliances under control of the foregoing collection method determination means 50, it is possible to continuously acquire discarded home electric appliances of the type or kind and quantity required. Consequently, it is possible to supply discarded home electric appliances to the recycling means 95 continuously, and recycling products can be obtained stably.

Although this embodiment deals with discarded home electric appliances, the same result can be achieved for other type or kind of waste.

According to this invention, it becomes possible for a recycling system, which reclaims waste, to feed waste to the recycling facility so that intended quantities of intended recycling products can be acquired.

What is claimed is:

1. An information management apparatus dealing with waste in a waste recycling system which collects waste stored in a plurality of depositories and reclaims the waste for recycling, said apparatus comprising:
   an information management means receiving input information from input means, storing said information in a database and outputting said information, for managing information on the kind and quantity of waste stored in each depository of said plurality of depositories; and
   a waste collection method determination means for determining the route of collection of waste, which is transported from said plurality of depositories to a recycling processor, using at least one of the process volume of said recycling processor and the stock volume of a stockyard of said recycling processor and said information output by said information management means.

2. An information management apparatus dealing with waste according to claim 1, wherein said waste collection method determination means comprises a computation means for performing computations to determine said route of collection of waste using a multi-layered neural network model.

3. An information management apparatus dealing with waste according to claim 1, wherein said waste collection method determination means further determines the kind and quantity of waste for recycling and depositories from which said kind and quantity of waste are to be collected, by fetching said information from said database, calculating a supply volume of waste using demand data for a reclamation product, searching said information for reclamation product waste to be collected, selecting ones of said reclamation product waste to be collected, and setting a collection route requiting minimum cost and time.

4. An information management apparatus dealing with waste according to claim 1, further comprising:
   a barcode input means which is connected to said information management means through a communication network, for scanning and entering barcode data attached to respective objects of waste to designate the kind and quantity of waste in said depositories, said information management means managing information sent from said barcode input means.

5. An information management apparatus dealing with waste according to claim 4, wherein said barcode input means includes an identification code label reading means for reading optical identification code labels appended to said objects of waste.

6. An information management apparatus dealing with waste in a waste recycling system which collects waste stored in a plurality of depositories, reclaims the waste for recycling and supplies recycling products to demanding parties, said apparatus comprising:
   an information management means receiving input information from input means, storing said information in a database and outputting said information, for managing information on the kind and quantity of waste stored in each depository of said plurality of depositories; and
   a waste collection method determination means for determining the route of collection of waste, which is transported from said plurality of depositories to a recycling processor, using at least one of the process volume of said recycling processor and the stock volume of a stockyard of said recycling processor and said information output by said information management means.

7. An information management apparatus dealing with waste according to claim 6, wherein said waste collection method determination means comprises a computation means for performing computations to determine said route of collection of waste using a multi-layered neural network model.

8. An information management apparatus dealing with waste according to claim 6, wherein said waste collection method determination means further determines the kind and quantity of waste desirable for recycling, and depositories from which said kind and quantity of waste are to be collected, by fetching said information from said database, calculating a supply volume of waste using demand data for a reclamation product, searching said information for reclamation product waste to be collected, selecting ones of said reclamation product waste to be collected, and setting a collection route requiring minimum cost and time.

9. An information management apparatus dealing with waste according to claim 6, further comprising:
   a barcode input means which is connected to said information management means through a communication network, for scanning and entering barcode data attached to respective objects of waste to designate the kind and quantity of waste in said depositories, said information management means managing information sent from said barcode input means.

10. An information management apparatus dealing with waste according to claim 9, wherein said barcode input means includes an identification code label reading means for reading optical identification code labels appended to objects of waste.

11. An information management apparatus dealing with waste in a waste recycling system which collects waste stored in a plurality of depositories and reclaims the waste for recycling, said apparatus comprising:

an information management means receiving input information from input means, storing said information in a database and outputting said information, for collecting information on the kind and quantity of waste stored in said plurality of depositories and managing the information of each depository of said plurality of depositories: and a waste collection method determination means for determining the route of collection of waste, which is transported from said depositories to a recycling processor, using at least one of the process volume and stock volume of said recycling processor, said information output by said information management means and geographic information of the area of collection.

12. An information management apparatus dealing with waste according to claim 11, wherein said waste collection method determination means determines the kind and quantity of waste for recycling and the depositories from which said kind and quantity of waste are to be collected, by fetching said information from said database, calculating a supply volume of waste using demand data for a reclamation product, searching said information for reclamation product waste to be collected, selecting ones of said reclamation product waste to be collected, and setting a collection route requiring minimum cost and time.

13. An information management apparatus dealing with waste according to claim 11, wherein said waste collection method determination means comprises a computation means for performing computations to determine said route of collection of waste using a multi-layered neural network model.

14. An information management apparatus dealing with waste in a waste recycling system which collects waste stored in a plurality of depositories, reclaims the waste for recycling and supplies recycling products to demanding parties, said apparatus comprising:

an information management means receiving input information from input means, storing said information in a database and outputting said information, for collecting information on the kind and quantity of waste stored in said plurality of depositories and managing the information of each depository of said plurality of depositories;

a recycling process volume determination means for determining the process volume of a recycling processor by tatting into consideration a quantity of recycling products demanded by said demanding parties; and a waste collection method determination means for determining the route of collection of waste, which is transported from said depositories to said recycling processor, using the process volume determined by said recycling process volume determination means, said information output by said information management means, geographic information of the area of collection and the stock volume of said recycling processor.

15. An information management apparatus dealing with waste according to claim 14, wherein said waste collection method determination means determines the kind and quantity of waste for recycling and the depositories from which said kind and quantity of waste are to be collected, by fetching said information from said database, calculating a supply volume of waste using demand data for a reclamation product, searching said information of reclamation product waste to be collected, selecting ones of said reclamation product waste to be collected, and setting a collection route requiting minimum cost and time.

16. An information management apparatus dealing with waste according to claim 14, wherein said waste collection method determination means comprises a computation means for performing computations to determine said route of collection of waste using a multi-layered neural network model.

* * * * *